March 27, 1928.  
W. E. DOUGHTY  
1,663,685  
APPARATUS FOR DISPENSING LIQUIDS  
Filed Feb. 1 1926
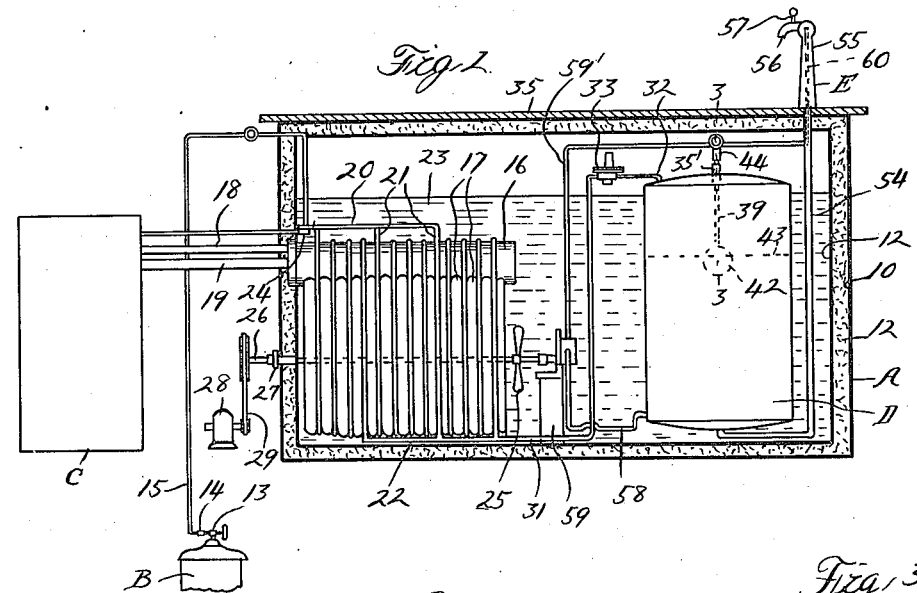
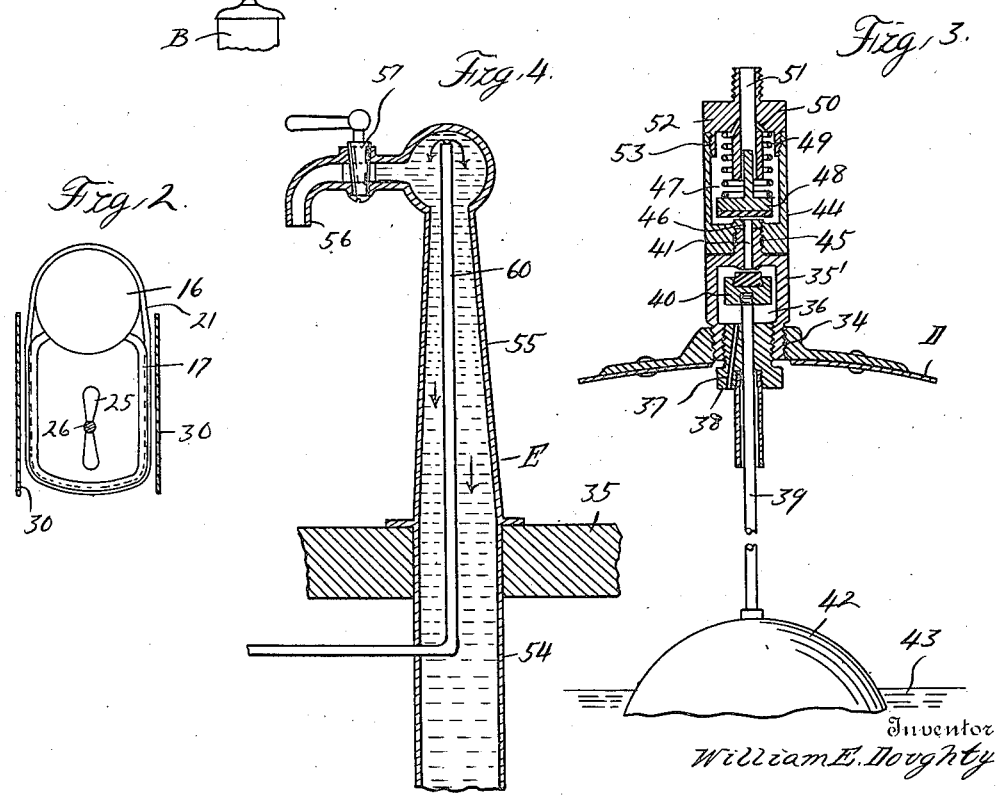
Inventor  
William E. Doughty Patented Mar. 27, 1928.

1,663,685

UNITED STATES PATENT OFFICE.

WILLIAM E. DOUGHTY, OF DETROIT, MICHIGAN, ASSIGNOR TO JAMES VERNOR COMPANY, OF DETROIT, MICHIGAN, A CORPORATION OF MICHIGAN.

APPARATUS FOR DISPENSING LIQUIDS.

Application filed February 1, 1926. Serial No. 85,347.

The invention relates to liquid dispensing and refers more particularly to an improved method and apparatus for dispensing liquids such as ginger ale for example. Heretofore, difficulty has been experienced in maintaining the ale or other liquid at the desired temperature at the point of dispensing from the system. For example, during the passage of the ale from the settling chamber or other source of supply of the ale to the point of discharge from the draft apparatus, the temperature is raised by contact with the relatively warm piping and draft apparatus. Such raising of temperature is especially objectionable during the summer months when the draft apparatus and piping leading therefrom to the settling chamber, or other source of supply of cool ale becomes quite warm. When the ale is drawn intermittently under such conditions the draft apparatus and piping becomes warm, between dispensing periods, so that unless the ale is drawn practically constantly it is considerably above the temperature of the ale in the settling chamber, or other source of supply.

One of the objects of the invention resides in the provision of means whereby the ale is maintained at the desired low temperature during its passage from the supply, such as a settling chamber to the point of dispensing avoiding the aforesaid difficulties due to contact of the ale with the piping and draft apparatus. Thus, the draft apparatus may be located as far as desired from the source of ale and cooling apparatus.

With these and other objects in view, the invention resides in the novel features of construction and combination and arrangements of parts as more fully hereinafter described and claimed.

Referring to the drawings in which like reference characters indicate corresponding parts—

Figure 1 represents an elevation view partly in cross section and diagrammatic to some extent, illustrating one embodiment of my invention;

Figure 2 is an end elevation view showing the header and coils of the refrigerating unit and parts associated therewith;

Figure 3 is a detail view in section along 3—3 of Figure 1; and

Figure 4 is a detail sectional elevation view of the draft apparatus.

In the drawings, reference character A represents a tank or refrigerating chamber having inner and outer walls 10 and 11 respectively with a temperature insulating medium 12 therebetween, such as cork, for example.

B represents a tank or container providing a source of the liquid to be dispensed described for purposes of illustration as ginger ale, the ale within the tank being carbonated in accordance with general practice and preferably under a relatively high pressure such as one hundred sixty pounds per square inch, for example. For convenience in handling, storage and shipment the tanks B may be of ten gallon size, for example, having a control valve 13 and coupling 14, the latter being adapted to detachably connect with a pipe or conduit 15. The latter pipe is passed through the tank A as shown in Figure 1.

For cooling the ale during its travel through the tank B or other source of supply to the point of dispensing I might provide a mechanical refrigerating unit C of the ordinary commercial type or other suitable construction. Such a unit includes a motor (not shown) and a thermostatically controlled switch (not shown) for cutting the motor in and out at the respective limits of temperature desired. Thus when the temperature rises above a predetermined point the thermostat will act to cut in the motor and thus act to lower the temperature with the control mechanism (as will later be apparent) until the desired low temperature limit is reached, at which time the thermostat will act to cut out the motor. Such operation for refrigerating units in general, is quite common and will be readily understood by one skilled in the art. 16 represents the header or boiler having the cooling coils 17 communicating therewith. Cooling fluid is circulated between the header and unit C through pipes 18 and 19 as will be readily understood. The pipe 15 is preferably formed with a header 20 and communicating therewith are a plurality of branch pipes 21, each of the latter pipes preferably being spirally coiled for a number of turns around the header 16 and cooling coil 17. The spiral coils of the branch pipes 21 preferably engage adjacent cooling coils 17 being nested closely therebetween whereby the heat of the coils 21 may be dissipated by conduction to the cooling coils 17.

The free ends of the branch pipes 21 are connected with another header 22 which is preferably positioned substantially adjacent the bottom of the tank A, this point being the coolest in the tank as will later be apparent.

The tank A is preferably partially filled with a liquid 23 such as water, the level of the same being preferably above the header 16 as shown. Located below this water level and preferably at the point of connection between pipe 15 and header 20 is the usual refrigerating unit motor control bulb 24, the latter preferably contacting with header 20 or pipe 15 so as to be subjected to the temperature of the ale passing from the relatively warm source B to the cooling coils 21. Thus the bulb is located at a point in the refrigerating system where the inflowing ale is the warmest, insuring the desired temperature at further points along the system. Also when ale is drawn from the system, relatively warmer ale will flow to the header 16 to replace the ale drawn and with the bulb 24 located adjacent the pipe 15 or header 20 an extremely sensitive control for the motor is obtained, more so than if the bulb were located so as to be entirely surrounded by the water 23.

A further feature of my invention resides in providing means for preventing the formation of an insulating film of cold water immediately adjacent the boiler 16 and cooling coils 17. To this end, I have provided a propeller agitator or circulating propeller 25 mounted on a shaft 26, the latter being extended through a suitable packed bearing 27. 28 is a motor for rotating shaft 26 and propeller 25 through reduction drive 29 when desired.

Referring to Figure 2, I have discovered that by providing vertical baffles 30 spaced adjacent the vertical portions of coils 17 and 21, a more concentrated flow of cold water will take place down between the baffles, serving to increase the rate of heat transfer to the cooling coils 17 and header 16 from the ale in the ale circuit. With the parts arranged substantially as shown in the drawings the coolest part of the water 23 will be at the bottom of tank A preferably where the ale is conducted from header 22 as by pipe 31.

In operation of the system as thus far described, when the ale is conducted from the pipe 31 by any suitable device such as hereinafter set forth, ale to replace that conducted away will flow from the supply tank B to the header 20, whence it will be distributed to the branch pipes 21 for cooling by circulation adjacent the cooling coils 17 and by the water 23 agitated by propeller 25. I have found it desirable to maintain the temperature of the ale at substantially 36° F. and to this end the mechanism controlling the operation of the refrigerating unit motor from the bulb 24 may be set to cut in the motor when the temperature in the bulb is 37° F and to cut out the motor at 34° F. The presence of the relatively large body of water 23 serves to stabilize the system preventing fluctuations of temperature within the chamber A. I have found that with fifty feet of one-quarter inch block tin ale-conducting pipe, within the chamber A my device described above, can cool forty gallons of ale per hour from 74° F. to 36° F. continuous flow. Such a capacity is sufficient for ordinary purposes and if added capacity is found desirable, the coils 21 or 17 or both of these coils may be increased. Preferably when added capacity or an increased rate of cooling of the ale is found desirable at any time, I have found it convenient to add cracked ice to the water 23. Such ice will not readily melt because of the relatively low temperature but will serve to readily and convenienty increase the rate of cooling of the ale.

Preferably within the chamber A and surrounded by the water 23 is a settling chamber D adapted to receive the high pressure ale from the pipe 31 and to afford partial relief of the ale pressure. The ale from pipe 31 passes into the settling chamber D as at 32, the flow being controlled by a pressure regulator 33 of standard or other suitable construction. This regulator 33 may be set to permit flow of ale into chamber D when the pressure in the chamber falls below any predetermined pressure, the latter being ordinarily governed by the head or distance the ale must flow vertically to the point of draft. The latter point is indicated in the drawings by the draft apparatus E shown mounted on counter 35 forming the top of tank A although the draft apparatus may be positioned at any other desired point remote with respect to the tank A, as for example, several floors above the tank. Thus for the relatively small head illustrated in the drawings, the pressure regulator 33 may be set to permit flow of the ale into the chamber D whenever the pressure therein falls below six pounds per square inch.

The ale flowing into the chamber D will become foamy, liberating a certain amount of the gas contained in the high pressure ale. In order to permit escape of this gas, to insure a relatively low pressure at all times of the ale in the settling chamber, to afford a proper taste of the ale, and to permit the ale to readily settle to liquid form, the following construction is provided.

Threadedly engaging an opening 34 in the top of chamber D, preferably above the water line, is a primary valve casing 35' providing a gas chamber 36. The gas from the settling chamber is free to pass to the chamber 36 through port 37 of plug 38, the latter having an axial bore affording a sliding bearing for valve stem 39 of a primary valve 40, the latter controlling the escape of gas from chamber 36 by way of the port 41. Connected with the valve stem 39 is a float 42 whereby the primary valve 40 is controlled by the settled or low pressure ale 43 within the settling chamber. 44 is a secondary valve casing connected as by a threaded engagement at 45 with the primary valve casing 35', the casing 44 having an inlet port 46 registering with the port 41 affording passage of the gas from chamber 36 to a chamber 47 in the secondary valve casing, the passage of gas thereto being controlled by a secondary valve 48 normally seated by a spring 49. The gas in chamber 47 is free to escape through ports 50 and 51, the latter communicating, by reason of suitable piping, preferably with the atmosphere. The compression of spring 49 may be regulated by rotating the cap 52, forming an abutment for the spring, at the point of threaded engagement 53 with casing 44.

I have found it desirable, for example, to arrange the spring 49 to act to seat the secondary valve 48 whenever the pressure of the gas in the settling chamber falls below two pounds per square inch, such pressure establishing a minimum for the ale in the settling chamber. When ale is drawn from the settling chamber the float 42 lowers unseating valve 40. If the pressure in the settling chamber is less than six pounds per square inch, high pressure ale will flow into the chamber D past regulator 33 from pipe 31. Whenever the pressure of ale in chamber D is more than two pounds per square inch, and the valve 40 unseated, the excess pressure passes from chamber D to primary valve chamber 36 past valve 40 and ports 41 and 46 to the secondary valve chamber 47, whence it acts to unseat secondary valve 48, the gas then escaping to the atmosphere by way of ports 50 and 51.

It will thus be noted that I have provided a control device whereby there will be at all times from two to six pounds per square inch pressure on the low pressure settle ale in the settling chamber D. Heretofore, "pop" valves were used to liberate the settled ale, these valves frequently become worn so as to leak, liberating all the gas from the settled ale and thus leaving the ale with a "flat" undesirable taste. With my invention the escape of the gas from the settling chamber is positively controlled by the height of the ale and when the valve 40 is unseated, then the valve 48 will operate to liberate gas in excess of two pounds per square inch pressure. Even if the valve 48 should leak, there is always a relatively large amount of gas being liberated by the inflowing high pressure ale and when the ale level rises, the valve 40 will positively close, thus trapping the remaining liberated gas from the ale in the settling chamber. There will always be a pressure on the settled ale of from two to six pounds per square inch. When the valve 40 closes, the regulator 33 will function as at other times to build up the pressure to six pounds per square inch.

As shown in Figure 1, the settling chamber D is preferably located within the tank A and nearly entirely surrounded by the cooling water 23. The propeller 25 serves to maintain the temperature of the water in the vicinity of chamber D, the same as the temperature in the vicinity of the cooling coils 17.

The ale from the chamber D is drawn off to the draft apparatus E by a pipe 54 preferably communicating with the chamber at the bottom where the surrounding cooling water is of the lowest temperature. The draft apparatus E is best shown in Figure 4 and compresses the draft arm 55 terminating in the draw-off spout or nozzle 56 controlled by a valve 57. As aforesaid, the regulator 33 may be set to correspond with the pressure necessary to force the ale up to the valve 57, the head being relatively low as shown in the drawings.

In order to maintain the temperature of the ale in the draft arm 55 equal to that in the chamber D, I have provided means for circulating the cold ale from the settling chamber to the draft arm so that as soon as valve 57 is opened, ale will be drawn from nozzle 56 at the temperature of the ale in the chamber D. To this end a circulating pipe 58 is connected preferably between the bottom of the chamber D and a circulating pump F mounted on support 59 and actuated preferably by the shaft 26. This pump forces the ale through pipe 59' which has a portion 60 extending upwardly into the draft arm 55 open ended so as to pass the cold ale from chamber D to a point adjacent the valve 57. Thus this circulating pipe will cause a continuous flow of cold ale upwardly through the pipe portion 60 and downwardly through the draft arm 55 and pipe 54 to the chamber D. Thus, even though the ale is drawn from the nozzle 56 at intermittent periods, the ale drawn will always be of a temperature the same as the ale in the chamber D. It will further be noted that the draft apparatus E may be located remotely from the chamber D or other source of cold ale, at the same time insuring properly cooled ale when drawn from the dispensing nozzle. I have thus avoided the objection of drawing ale warmed during passage from the source of supply to the dispensing nozzle.

While it is believed from the foregoing description, the nature and advantage of my invention will be readily understood, I desire to have it understood that I do not limit myself to which is herein shown and described and that such changes may be resorted to when desired, as fall within the scope of the claims.

What I claim as my invention is:—

1. A liquid dispensing device comprising a draft arm, a dispensing nozzle, said draft arm forming a conduit for the passage of the liquid from a supply under pressure, a valve controlling the passage of the liquid from the draft arm to the nozzle, and means for circulating a cooling liquid between a source of supply and through said draft arm.

2. A liquid dispensing device comprising a draft arm, a dispensing nozzle, said draft arm forming a conduit for the passage of the liquid from a supply under pressure, a valve controlling the passage of the liquid from the draft arm to the nozzle, means for circulating a cooling liquid between a source of supply and through said draft arm, the said cooling liquid being introduced into the draft arm at a point substantially adjacent the pressure side of the said valve.

3. A liquid dispensing device comprising a source of liquid under pressure, a draft pipe communicating with said source, a valve controlling the flow of the liquid from the draft pipe, and means for circulating the liquid in the draft pipe between the valve and the said source of liquid.

4. A liquid dispensing device comprising a source of low temperature liquid under pressure, a draft pipe communicating with said source, a valve controlling the flow of the liquid from the draft pipe, and means for circulating the liquid in the draft pipe between the valve and the said source of the liquid for maintaining the liquid in the draft pipe at the same temperature as that of the liquid in the said source.

5. A liquid dispensing device comprising a container having therewithin a liquid to be dispensed, a valve controlled dispensing apparatus, a pipe communicating with the liquid in the container and the draft apparatus for conducting the liquid from the container to the draft apparatus, and means for causing a flow of cooling liquid in said pipe counter to the flow therein when said valve is unseated.

6. A draft apparatus for dispensing a liquid under pressure comprising a valve controlled pipe containing the liquid to be dispensed, and a circulating pipe having an outlet substantially at the pressure side of said valve and within the pipe, and means for conducting the liquid under a pressure greater than that aforesaid through said circulating pipe.

7. A draft apparatus for dispensing a liquid under pressure comprising a valve controlled pipe containing the liquid to be dispensed and a cooling liquid circulating pipe having an outlet within said first pipe for maintaining the liquid therein at a predetermined temperature.

8. A draft apparatus for dispensing a liquid under pressure comprising a valve controlled pipe containing the liquid to be dispensed and a cooling liquid circulating pipe having an outlet portion extending through said first pipe and terminating at a point substantially adjacent the said valve.

9. A draft apparatus for dispensing a liquid under pressure comprising a valve controlled pipe containing the liquid to be dispensed and a cooling liquid circulating pipe having an outlet portion extending through said first pipe and terminating at a point substantially adjacent the said valve, and means for circulating a cooling liquid through the circulating pipe.

10. A liquid dispensing device comprising a valve controlled draft pipe containing the liquid to be dispensed under pressure and a cooling liquid circulating pipe within the draft pipe.

11. A liquid dispensing device comprising a valve controlled draft pipe containing the liquid to be dispensed under pressure and a cooling pipe within the draft pipe.

12. In a liquid dispensing apparatus, the combination with a source of liquid under pressure, and a dispensing conduit, of means for discharging a cooling liquid into the dispensing conduit adjacent the outlet end thereof.

13. In an apparatus for dispensing carbonated beverages, the combination with a supply of beverage under pressure and a discharge conduit adapted to be maintained full of the said beverage by the pressure on the supply, of means for discharging a cooling liquid into the discharge conduit into contact with the liquid under pressure therein.

14. In a liquid dispensing device, the combination with a draft arm having a dispensing valve, of means for continuously discharging a cooling liquid into said draft arm adjacent said valve to be discharged through the said valve.

15. The combination in a beverage dispensing apparatus, of a conduit adapted to contain a beverage to be dispensed, and means for discharging beverage of a lower temperature into said conduit into contact with the beverage to be dispensed therefrom.

In testimony whereof I affix my signature.

WM. E. DOUGHTY.